(12) United States Patent
Bell

(10) Patent No.: US 12,510,467 B2
(45) Date of Patent: Dec. 30, 2025

(54) METHOD AND APPARATUS FOR REMOVING NOISE FROM DATA

(71) Applicant: RENISHAW plc, Wotton-under-Edge (GB)

(72) Inventor: Ian Mac Bell, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 121 days.

(21) Appl. No.: 18/565,310

(22) PCT Filed: Jun. 6, 2022

(86) PCT No.: PCT/GB2022/051412
§ 371 (c)(1),
(2) Date: Nov. 29, 2023

(87) PCT Pub. No.: WO2022/258951
PCT Pub. Date: Dec. 15, 2022

(65) Prior Publication Data
US 2024/0280474 A1    Aug. 22, 2024

(30) Foreign Application Priority Data
Jun. 9, 2021  (GB) ..................... 2108208

(51) Int. Cl.
*G01N 21/27*  (2006.01)
(52) U.S. Cl.
CPC ..... *G01N 21/274* (2013.01); *G01N 2201/127* (2013.01); *G01N 2201/1296* (2013.01)
(58) Field of Classification Search
CPC ....... G01N 2201/13; G01N 2201/1296; G01N 2201/129; G01N 2201/12776; G01N 2201/12746; G01N 2201/127; G01N 21/274; G01N 21/272; G01N 21/27; G01N 21/25; G01N 21/17; G01J 3/4412; G01J 3/4406; G01J 3/44; G01J 3/28; G01J 2003/4424; G01J 2003/4418; G01J 2003/2879; G01J 2003/2876;
(Continued)

(56) References Cited

U.S. PATENT DOCUMENTS

| 5,442,438 A | 8/1995 | Batchelder et al. |
| 5,510,894 A | 4/1996 | Batchelder et al. |

(Continued)

FOREIGN PATENT DOCUMENTS

CN    111766210 A    10/2020

OTHER PUBLICATIONS

Aug. 12, 2022 International Search Report issued in International Patent Application No. PCT/GB2022/051412.

(Continued)

*Primary Examiner* — Georgia Y Epps
(74) *Attorney, Agent, or Firm* — Oliff PLC

(57) ABSTRACT

A method for removing noise from spectral data recorded using a spectrometer. The method includes normalising spectral data to generate normalised spectral data and applying a machine learning model to the normalised spectral data. The machine learning model is trained to remove noise from spectral data using normalised training data, wherein the spectral data is normalised based on a different scaling to the normalisation of the training data.

13 Claims, 8 Drawing Sheets

(58) Field of Classification Search
CPC ....... G01J 2003/2873; G01J 2003/2869; G01J 2003/2866; G01J 2003/2843; G01J 2003/284; G01J 2003/2836; G01J 2003/2833; G01J 2003/283
See application file for complete search history.

(56) References Cited

U.S. PATENT DOCUMENTS

| | | | |
|---|---|---|---|
| 5,689,333 | A | 11/1997 | Batchelder et al. |
| 7,640,140 | B2* | 12/2009 | Ruchti ............... A61B 5/14532 600/316 |
| 10,746,599 | B2 | 8/2020 | Yu |
| 11,191,342 | B2 | 12/2021 | Elfakhri et al. |
| 2005/0240090 | A1* | 10/2005 | Ruchti ............... A61B 5/14532 600/316 |
| 2016/0163522 | A1* | 6/2016 | Röder .................. G06V 20/698 250/281 |
| 2020/0132547 | A1 | 4/2020 | Yu |
| 2021/0015240 | A1 | 1/2021 | Elfakhri et al. |
| 2024/0170093 | A1* | 5/2024 | Ramirez ............... G16B 15/00 |
| 2024/0280474 | A1* | 8/2024 | Bell .................... G01N 21/274 |
| 2024/0383465 | A1* | 11/2024 | Benetti ............... G07C 5/0816 |
| 2024/0402147 | A1* | 12/2024 | Hsu ........................ H01J 49/42 |

OTHER PUBLICATIONS

Aug. 12, 2022 Written Opinion of the International Searching Authority issued in International Patent Application No. PCT/GB2022/051412.
Sep. 7, 2021 Search Report issued in British Patent Application No. 2108208.6.
De Haan et al. "Deep-learning-based image reconstruction and enhancement in optical microscopy". Proceedings of the IEEE, vol. 108, No. 1, Jan. 2020, pp. 30-50.
Brownlee, Jason. "How to use data scaling improve deep learning model stability and performance". Machine Learning Mastery, Feb. 4, 2022, pp. 1-42, https://machinelearningmastery.com/how-to-improve-neutral-network-stability-and-modelling-performance-with-data-scaling/.
Jiang, Y. et al. "Deep learning denoising based line spectral estimation". IEEE Signal Processing Letters, vol. 26, No. 11, Nov. 2019, pp. 1573-1577.
Zhang et al. "DeepSpectra: An end-to-end deep learning approach for quantitative spectral analysis". Analytica Chimica Acta, 1058 (2019), pp. 48-57.
Shin et al. "Early-stage lung cancer diagnosis by deep learning-based spectrocopic analysis of circulating exosomes". ACS Nano, May 2020, vol. 14, pp. 5435-5444.

* cited by examiner

METHOD AND APPARATUS FOR REMOVING NOISE FROM DATA

FIELD OF INVENTION

This invention concerns methods and apparatus for removing noise from data, in particular spectral data recorded using a spectrometer. The method and apparatus have particular application to Raman spectrometry, though it can also be used in other forms of spectroscopy, e.g. narrow-line photoluminescence, fluorescence, cathode-luminescence, UV visible (UV Vis), nuclear magnetic resonance (NMR), mid infra-red (mid-IR) or near infra-red (NIR).

BACKGROUND

The Raman Effect is the inelastic scattering of light by a sample. In Raman Spectroscopy, a sample is irradiated by monochromatic laser light and the scattered light is then dispersed by a dispersive device, such as a diffraction grating, e.g. in a monochromator, to generate a spectrum called a Raman spectrum. The Raman spectrum is detected by a detector such as a charge-coupled device (CCD). Examples of Raman spectroscopy apparatus are known from U.S. Pat. Nos. 5,442,438 and 5,510,894, which are incorporated herein by reference.

Different chemical compounds have different characteristic Raman spectra. Accordingly, the Raman effect can be used to analyse chemical compounds present in a sample.

The detected spectrum comprises the Raman spectrum together with noise generated by the system and the surrounding environment. It is desirable to process the spectral data to remove noise from spectral data before analysing the spectral data to identify components present in a sample.

SUMMARY

According to a first aspect of the invention there is provided a method for removing noise from spectral data recorded using a spectrometer, the method comprising normalising spectral data to generate normalised spectral data and applying a machine learning model to the normalised spectral data, the machine learning model trained to remove noise from spectral data using normalised training data, wherein the spectral data is normalised based on a different scaling to the normalisation of the training data.

A data normalisation step (feature scaling) is typically carried out on training data before the (normalised) training data is used to train a machine learning model, such as a neural network model, so that all the training data will be on the same scale. Later spectral data to which the machine learning model is applied is typically normalised to the same scale. However, the inventor has found that when the machine learning model is applied to spectral data scaled to higher values the effect of the machine learning model in removing noise is reduced along with any damage to real high-frequency features. The converse is true when the machine learning model is applied to spectral data scaled to lower values. Therefore, by adjusting the scaling of the spectral data relative to the scaling of the training data, the user can control a degree of noise removal. In this way, a user can control the degree of noise removal without having to wait for a new machine learning model to be calculated based on rescaled training data. After application of the machine learning model to the spectral data (to produce modified spectral data), the normalisation applied to the spectral data prior to applying the machine learning model is reversed through a rescaling of the modified spectral data. This modified spectral data may be output, such as displayed to a user.

It will be understood that the term "different scaling" as used herein means increasing or diminishing the normalised value that would otherwise be obtained using the normalisation algorithm, e.g. formula, used to normalise values of the training data. The different scaling may be obtained by adding a multiplier (different to 1) to a normalisation algorithm used to determine normalised values for the training data.

The term "machine learning model" as used herein means an algorithm, built using machine learning based on training data, that can be applied to like-data to perform a particular task, in this invention noise removal.

The spectral data may be intensity values of electromagnetic radiation detected at different wavelengths/wavenumbers/frequencies by the spectrometer.

The normalisation may be a rescaling (min-max value normalisation or max value normalisation) and the different scaling a scaling of the spectral data to a different range to the scaling of the training data. For example, the training data may be scaled to be in the range [0,1], whereas the spectral data may be scaled to be in a different range, for example with a maximum value differing from 1. The different scaling may be a multiplier applied to normalised values, x', given by, $$x' = \frac{x - \min(x)}{\max(x) - \min(x)}$$

wherein x is the intensity value of the spectral data at a particular wavelength/wavenumber/frequency. max(x) is the maximum x value in the spectral data. min(x) is the minimum x value in the spectral data.

The normalisation may be a max-value normalisation, wherein normalised values, x', are given by:

$$x' = \frac{x}{\max(x)}$$

The normalisation may be a mean (mean-centre) value normalisation. The different scaling may be a multiplier applied to normalised values, x', given by, $$x' = \frac{x - \bar{x}}{\max(x) - \min(x)}$$

wherein x is the intensity value of the spectral data at a particular wavelength/wavenumber/frequency.

The normalisation may be a standardisation (Z-score) normalisation. The different scaling may be a multiplier applied to normalised values, x', given by, $$x' = \frac{x - \bar{x}}{\sigma}$$

wherein x is the intensity value of the spectral data at a particular wavelength/wavenumber/frequency and σ is the standard deviation. In a further embodiment, the divisor may by a variance rather than standard deviation.

The method may comprise receiving a selection of the different scaling to apply to the spectral data from a user.

The method may comprise generating the spectral data by carrying out spectroscopy, such as Raman spectroscopy, on a sample.

The method may comprise outputting, such as a display on a screen, processed spectral data generated by applying the machine learning model to the spectral data. The method may comprise analysing the processed spectral data to determine components present in the sample. The method may comprise generating an output, such as a display on a screen, identifying one or more components determined as present in the sample.

The method may be computer-implemented.

According to a second aspect of the invention there is provided a method for removing noise from recorded data, the method comprising normalising the recorded data to generate normalised recorded data and applying a machine learning model to the normalised recorded data, the machine learning model trained to remove noise from recorded data using normalised training data, wherein the recorded data is normalised based on a different scaling to the normalisation of the training data.

According to a third aspect of the invention there is provided apparatus comprising a processor configured to carry out the method of the first aspect or second aspect of the invention.

The apparatus may comprise a spectrometer.

The apparatus may comprise an interface configured to receive an input from the user of the different scaling to apply to the spectral data.

The apparatus may comprise an output device, such as a screen, to output normalised values of the spectral data and/or one or more components determined as present in the sample.

According to a fourth aspect of the invention there is provided a data carrier having instructions stored thereon which, when executed by a processor, cause the processor to carry out the method of the first or second aspects of the invention.

The data carrier may be a non-transient data carrier, such as volatile memory, e.g. RAM, non-volatile memory, e.g. ROM, flash memory and data storage devices, such as hard discs, optical discs, or a transient data carrier, such as an electronic or optical signal.

DESCRIPTION OF EMBODIMENTS

Figure 1:
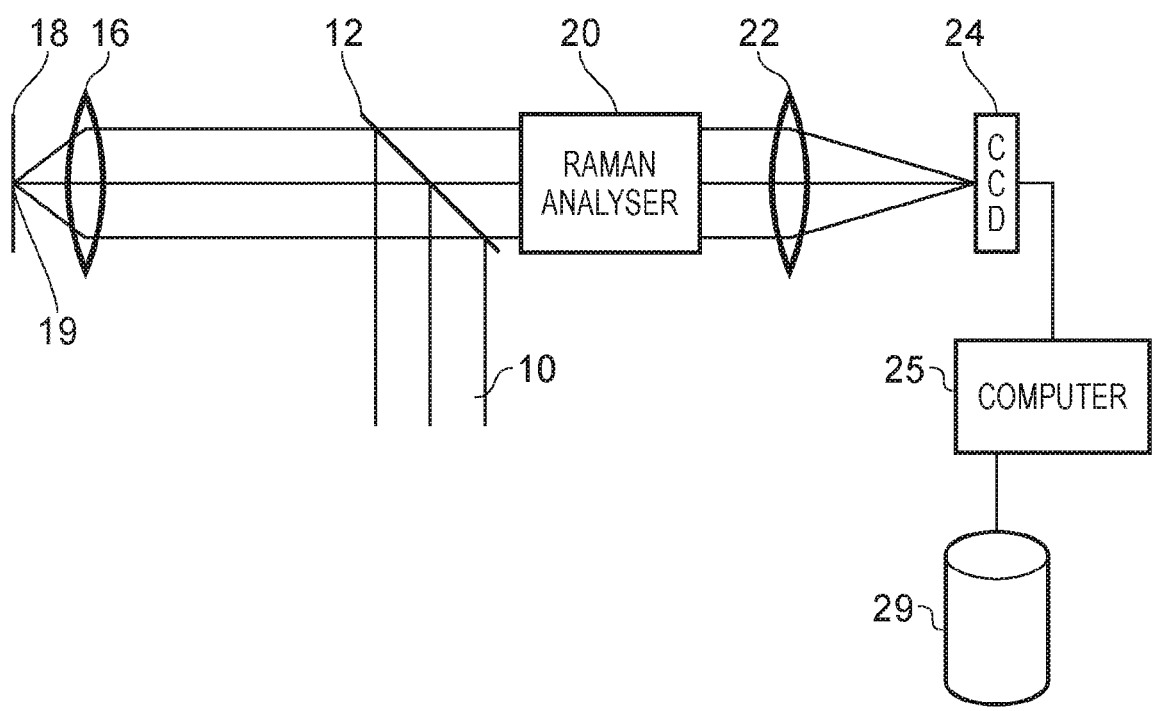
FIG. 1 is a schematic illustration of a spectrometer apparatus according to an embodiment of the invention.
Figure 2:
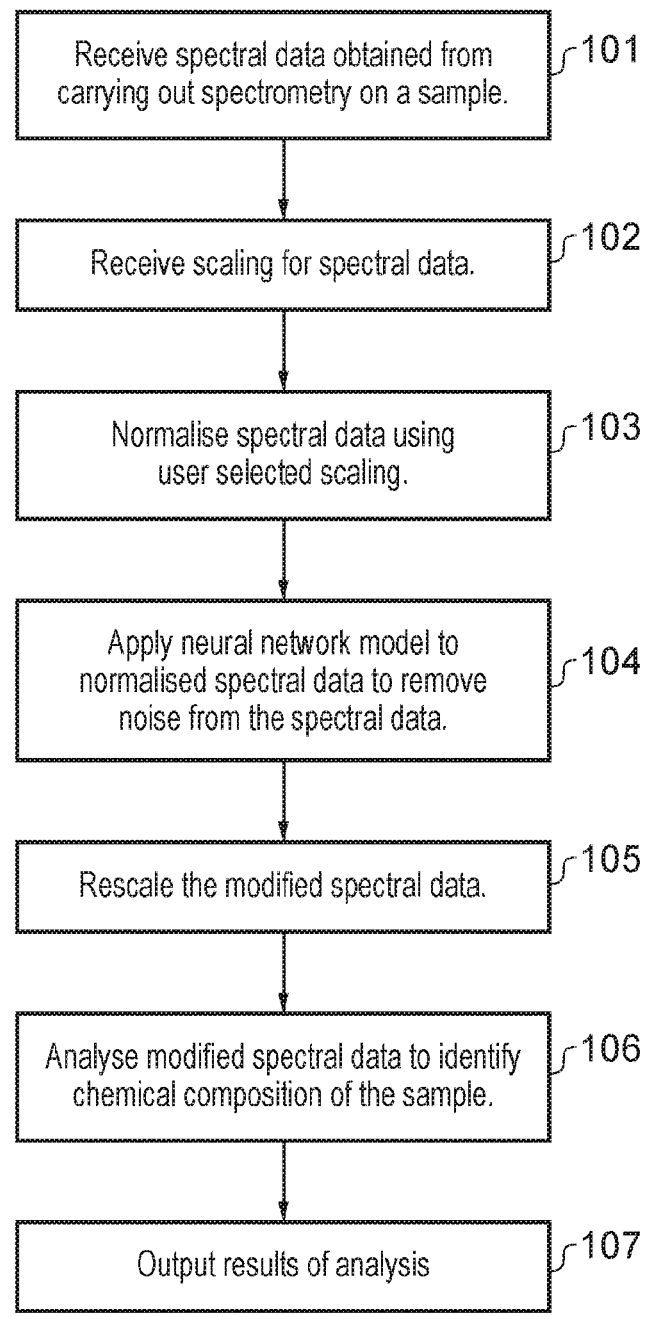
FIG. 2 is a schematic illustration of data processing modules or programmed functions of the spectrometer apparatus.

Referring to FIG. 1, apparatus according to the invention comprises a Raman spectrometer connected to a computer 25 that has access to memory 29.

The Raman spectrometer comprises an input laser beam 10 reflected through 90 degrees by a dichroic filter 12, placed at 45 degrees to the optical path. Alternatively a holographic dichroic filter may be placed at a low angle of incidence such as 10 degrees. The laser beam then passes to an objective lens 16, which focuses it to a spot at its focal point 19 on a sample 18. Light is scattered by the sample at this illuminated spot, and is collected by the objective lens 16 and collimated into a parallel beam which passes back to the dichroic filter 12. The filter 12 rejects Rayleigh scattered light having the same frequency as the input laser beam 10, and transmits the Raman scattered light. The Raman scattered light then passes to a Raman analyser 20.

The Raman analyser 20 comprises a dispersive element such as a diffraction grating. The light from the analyser 20 is focused by a lens 22 onto a suitable photo-detector 24. A photo-detector array is preferred. In the present embodiment the detector 24 is a charge-coupled device (CCD), which consists of a two-dimensional array of pixels, and which is connected to the computer 25 which acquires data from each of the pixels and analyses it as required. The analyser 20 produces a spectrum spread out in a line along the CCD 24.

Samples 18 may be mounted on an X-Y table so that the focal point 19 can be scanned across it in X and Y directions, e.g. under control of the computer 25. A plurality of spectra can then be gathered, each spectrum corresponding to a different point on the sample. A map can then be generated based upon properties of the sample determined from the collected spectra.

The computer 25 is programmed with software code on a suitable medium, such as memory 29, comprising instructions, which when executed by a processor of computer 25 cause the computer 25 to perform the analysis routines described below. Alternatively, the data on the Raman spectrum/spectra obtained may be transferred to a separate computer having such software for this analysis. In either case, as the analysis proceeds, the values determined are stored in the computer concerned, and may be further processed and output or displayed to show the concentrations of the components in the sample/samples.

To process the spectral data to determine the Raman spectrum/spectra present and therefore, the chemical component(s)/properties of the sample, the spectral data is first processed to remove noise.

The processor receives 101 spectral data generated by the Raman spectrometer from a sample and 102 a user selection of a scaling to apply in the normalisation of the spectral data. The scaling may be greater or less than the scaling applied in the normalisation of the training data used to train a machine learning model. In this embodiment a neural network model is used, in particular a Recurrent Neural Network (RNN) (specifically a bidirectional Long Short Term Memory (LSTM) network). The scaling applied to the training data is deemed to be N=1 and the scaling applied to the spectral data is a ratio of the scaling applied to the training data set by the user selecting a value of N for the spectral data greater or less than 1.

The spectral data is normalised 103 using the same normalisation algorithm as that used for training data but further multiplied by the value of N selected by the user for the spectral data. In this embodiment, the normalisation of the spectral data is a max value normalisation given by:

$$x' = N\left(\frac{x}{\max(x)}\right)$$

wherein x is the intensity value of the spectral data at a particular wavelength/wavenumber/frequency and x' is the normalised value.

The neural network model is applied 104 to normalised spectral data to remove noise from the spectral data. After application of the machine learning model to the spectral data (to produce modified spectral data), the normalisation applied to the spectral data prior to applying the machine learning model is reversed 105 through a rescaling of the modified spectral data. The rescaled modified spectral data with noise removed is then subject to analysis 106 to identify a chemical composition of the sample from the spectral data. This typically involves fitting a curve to the spectral data from which noise has been removed, for example fitting known Raman spectra to the spectral data. The result of the analysis is output 107 to the user, for example by display on a screen.

Figure 3A:
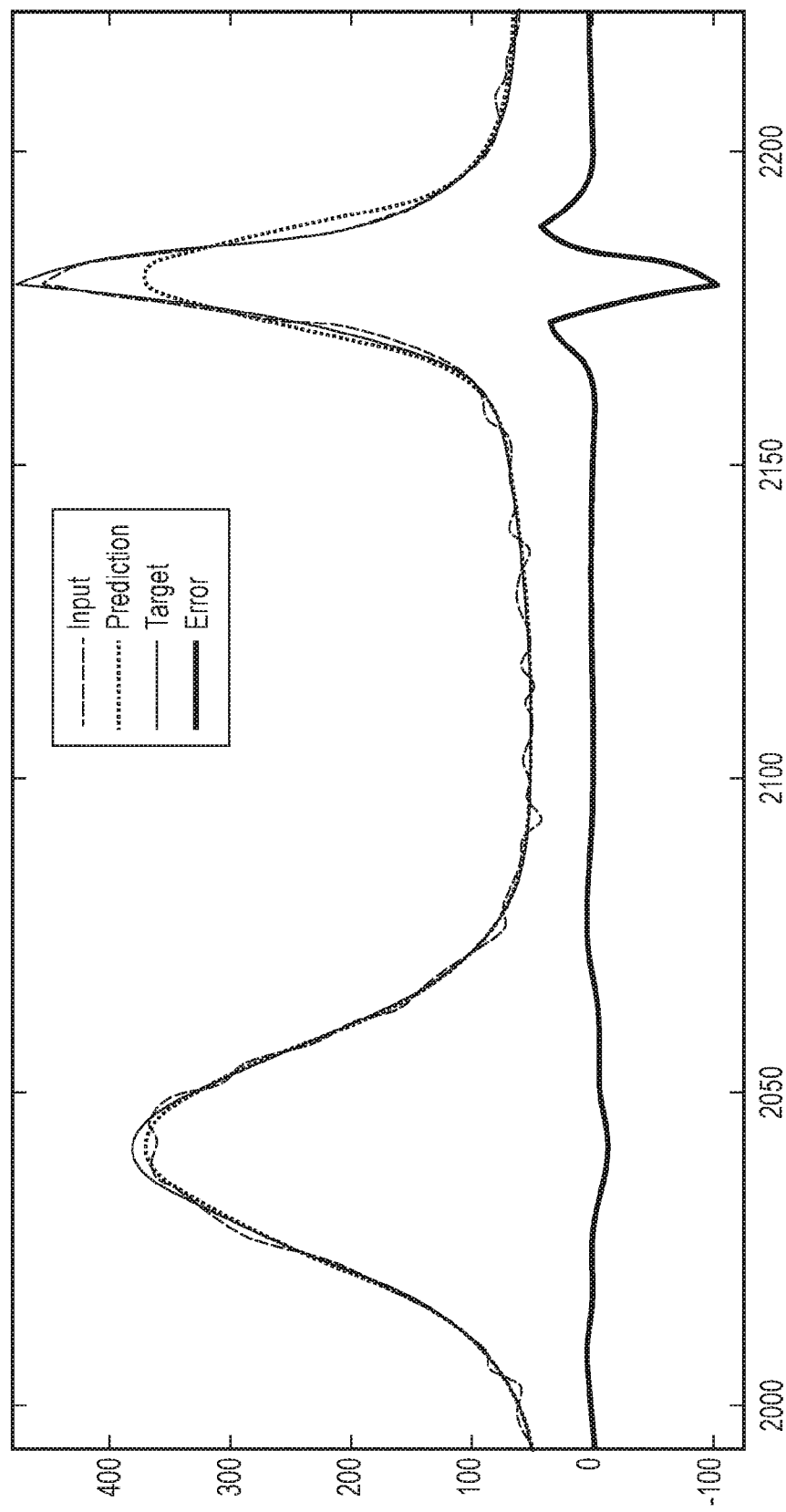
FIGS. 3a and 3b are graphs illustrating spectral data processed using a neural network model, wherein the spectral data input to the neural network model has been normalised to the same scale as the training data.
Figure 3B:
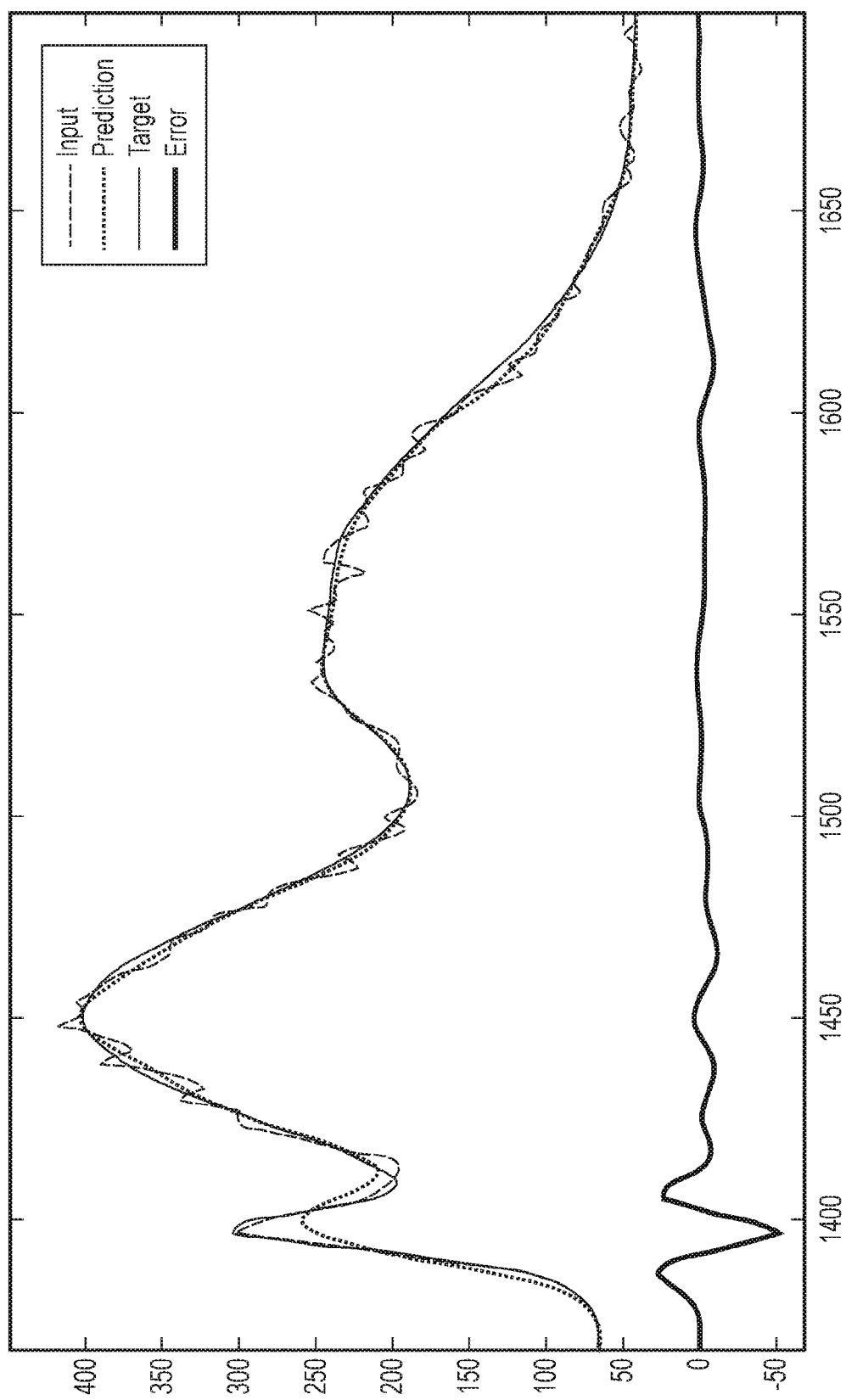
Figure 4A:
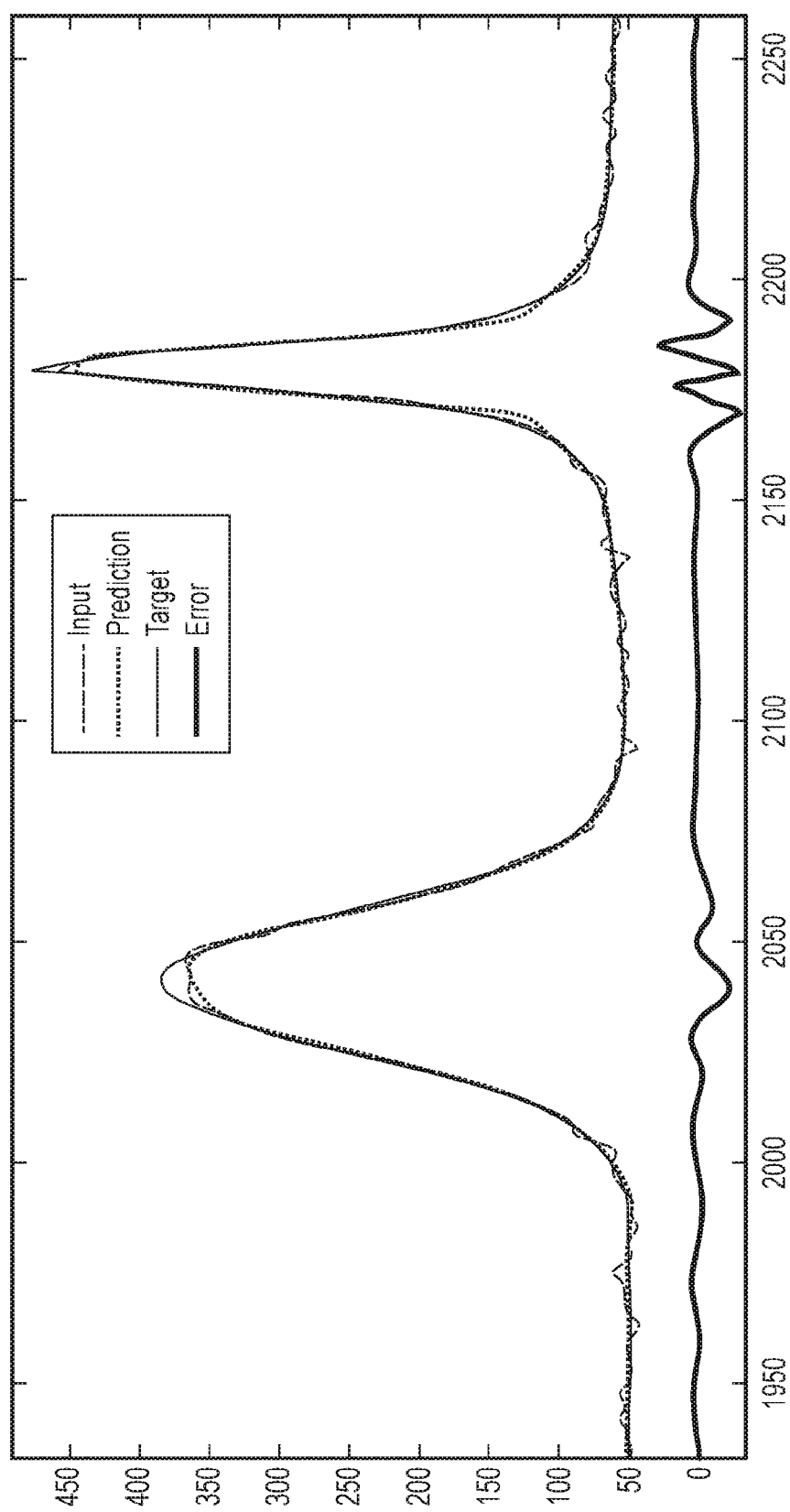
FIGS. 4a and 4b are graphs illustrating the same spectral data processed using a neural network model, wherein the spectral data input to the neural network model has been normalised to a broader range than the training data.
Figure 4B:
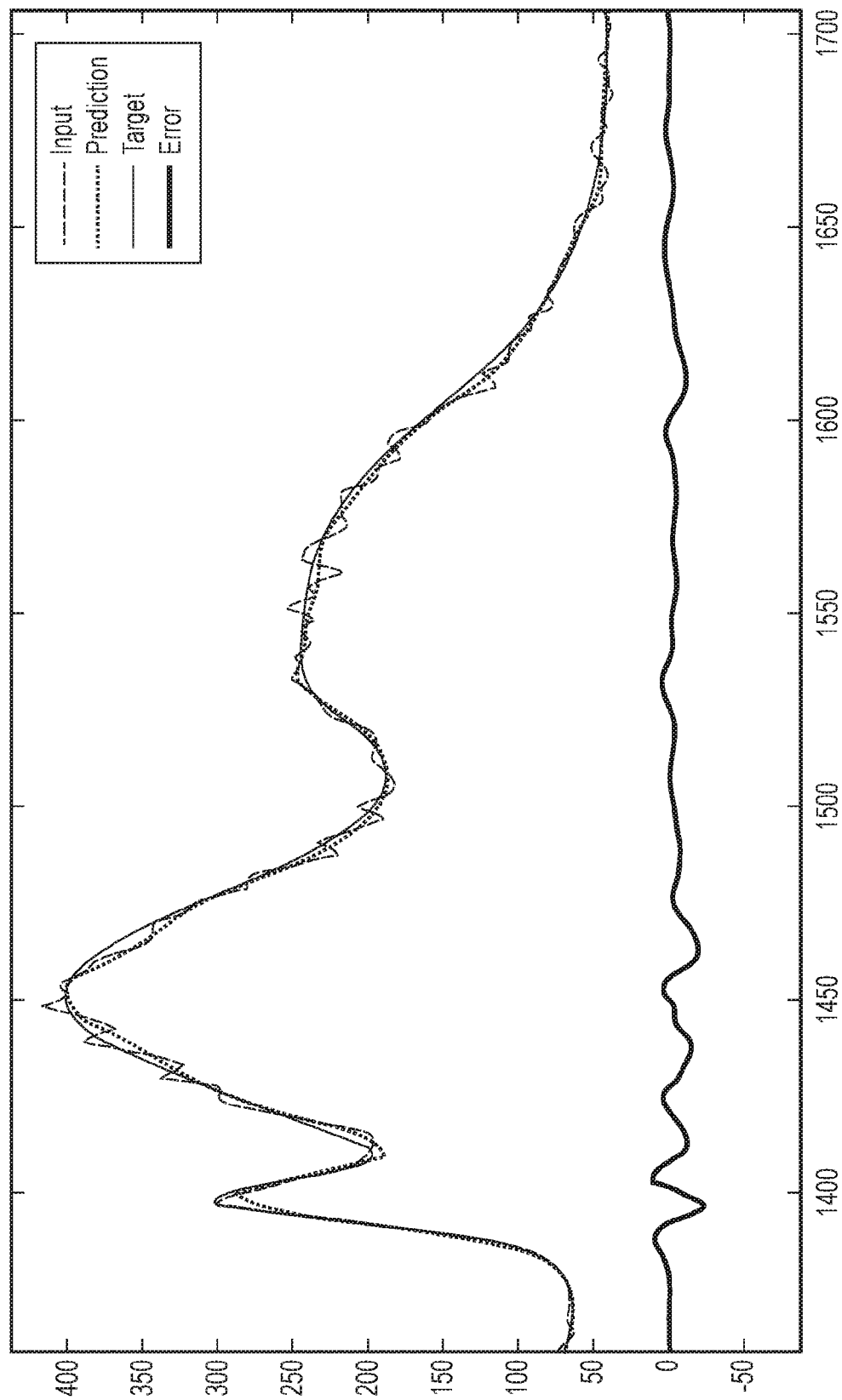

FIGS. 3a and 3b are graphs showing two different input spectral data (generated by computer with simulated noise), a corresponding predicted (fitted) curve, a corresponding target spectrum and the error when the spectral data is normalised for N=1 (the scaling of the normalisation is the same as that for the training data). FIGS. 4a and 4b are graphs showing the same input spectral data, a corresponding predicted (fitted) curve, the target spectrum and the error when the spectral data is normalised for N=3 (the scaling of the normalisation is different as that for the training data). As can be seen, the spectral data normalised for N=3 shows better performance at replicating the high frequency Raman features in the data.

Figure 5:
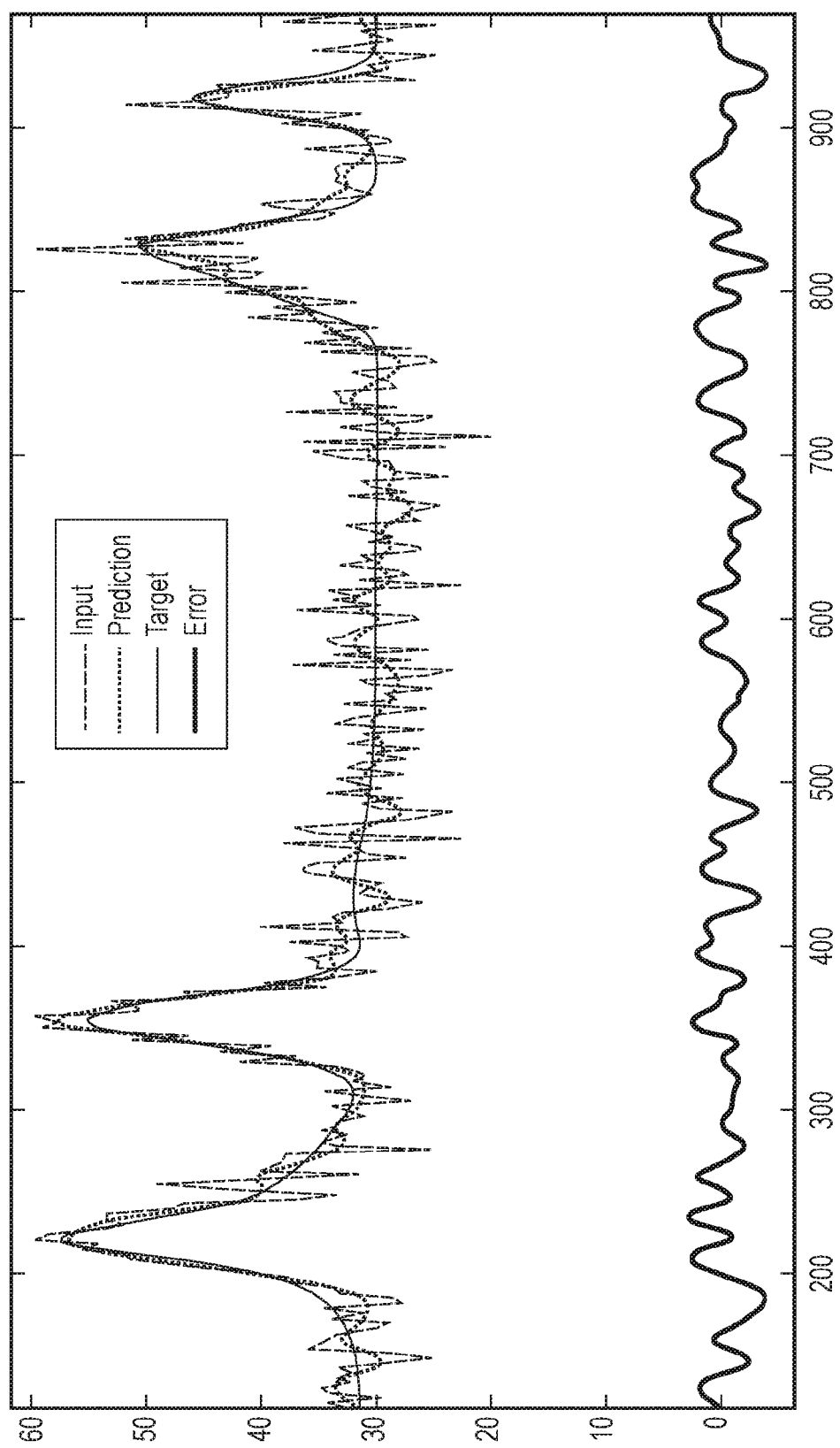
FIG. 5 is a graph illustrating spectral data processed using a neural network model, wherein the spectral data input to the neural network model has been normalised to the same scale as the training data.
Figure 6:
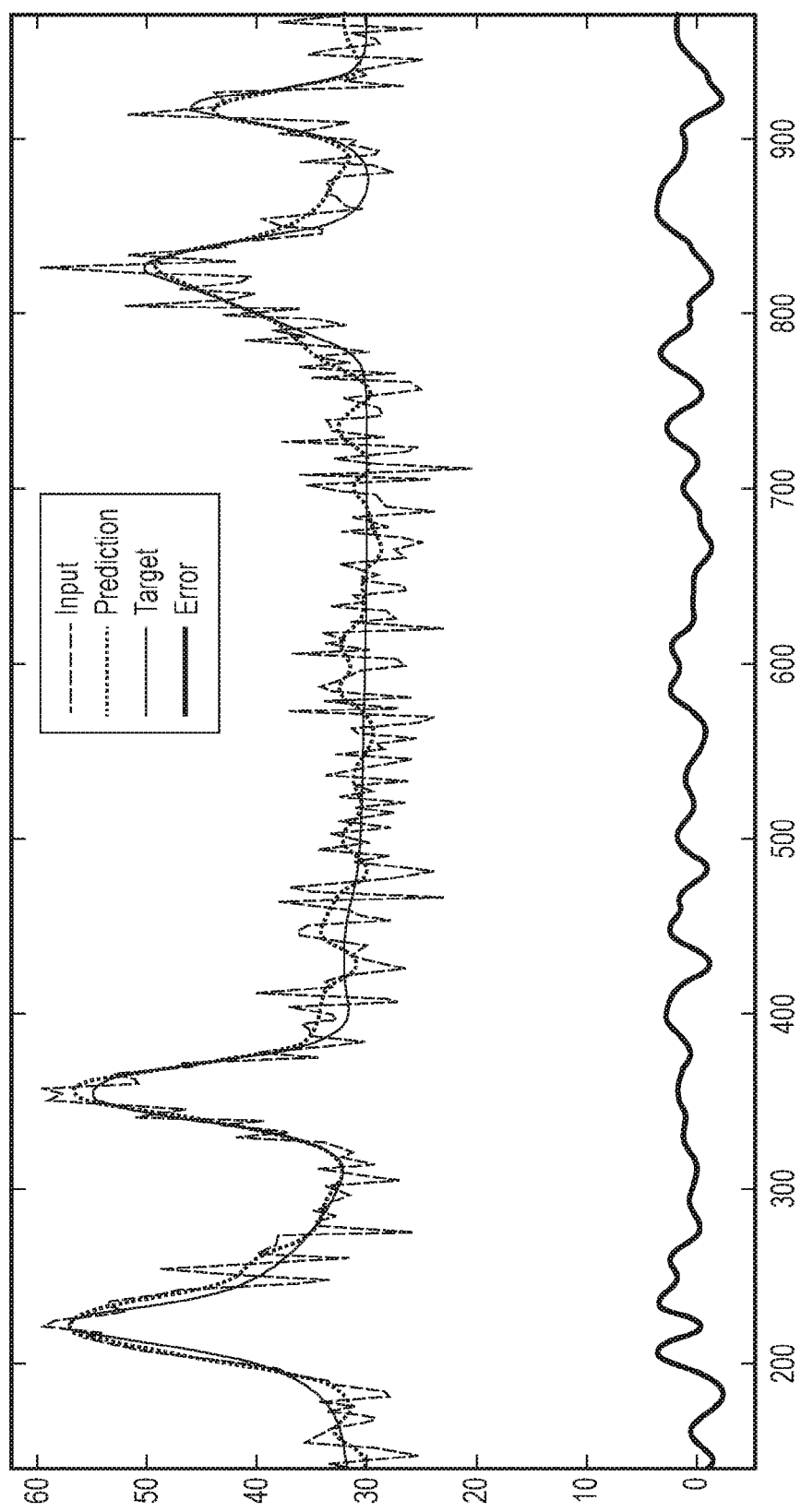
FIG. 6 is a graph illustrating the same spectral data as in FIG. 5 processed using a neural network model, wherein the spectral data input to the neural network model has been normalised to a narrower range than the training data.

FIG. 5 is a graph showing further input spectral data (generated by computer with simulated noise), a corresponding predicted (fitted) curve, a corresponding target spectrum and the error when the spectral data is normalised for N=1 (the scaling of the normalisation is the same as that for the training data). FIG. 6 is a graph showing the further input spectral data, a corresponding predicted (fitted) curve, the corresponding target spectrum and the error when the spectral data is normalised for N=0.01. As can be seen, the spectral data normalised for N=0.01 shows a reduced tendency to noise following.

Accordingly, by selecting the scaling of the spectral data relative to the training data, it is possible to alter the degree of noise removal without having to generate a new neural network model. Therefore, the method allows the user to control an amount of noise removal depending on user requirements whilst using the same neural network model.

The invention claimed is:

1. A method for removing noise from spectral data recorded using a spectrometer, the method comprising normalising spectral data to generate normalised spectral data and applying a machine learning model to the normalised spectral data, the machine learning model trained to remove noise from spectral data using normalised training data, wherein the spectral data is normalised based on a different scaling to the normalisation of the training data.

2. A method according to claim 1, wherein the normalisation is a rescaling and the different scaling a scaling of the spectral data to a different range to the scaling of the training data.

3. A method according to claim 1, wherein the normalisation is a mean value normalisation.

4. A method according to claim 1, wherein the normalisation is a standardisation normalisation.

5. A method according to claim 1, comprising receiving a selection of the different scaling to apply to the spectral data from a user.

6. A method according to claim 1, comprising generating the spectral data by carrying out spectroscopy on a sample.

7. A method according to claim 1, comprising outputting processed spectral data generated by applying the machine learning model to the spectral data.

8. A method according to claim 1, wherein the method is computer-implemented.

9. Apparatus comprising a hardware-based processor configured to carry out the method of claim 1.

10. Apparatus according to claim 9, comprising a spectrometer.

11. Apparatus according to claim 9, comprising an interface configured to receive an input from a user of the different scaling to apply to the spectral data.

12. Apparatus according to claim 9 comprising an output device configured to output normalised values of the spectral data and/or one or more components determined as present in a sample.

13. A non-transitory computer readable storage medium having instructions stored thereon which, when executed by a processor, cause the processor to carry out the method of claim 1.

* * * * *